United States Patent
Toya et al.

(10) Patent No.: US 12,113,213 B2
(45) Date of Patent: Oct. 8, 2024

(54) CATHODE ACTIVE MATERIAL FOR NON-AQUEOUS ELECTROLYTE SECONDARY BATTERY AND MANUFACTURING METHOD FOR SAME, AND NON-AQUEOUS ELECTROLYTE SECONDARY BATTERY

(71) Applicants: SUMITOMO METAL MINING CO., LTD., Tokyo (JP); TOYOTA JIDOSHA KABUSHIKI KAISHA, Aichi (JP)

(72) Inventors: Hiroyuki Toya, Ehime (JP); Masahiro Morita, Aichi (JP); Hiroki Nagai, Aichi (JP); Yoshinari Makimura, Aichi (JP); Tetsuro Kobayashi, Aichi (JP)

(73) Assignees: SUMITOMO METAL MINING CO., LTD., Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 203 days.

(21) Appl. No.: 14/907,087

(22) PCT Filed: Jul. 22, 2014

(86) PCT No.: PCT/JP2014/069371
§ 371 (c)(1),
(2) Date: Jan. 22, 2016

(87) PCT Pub. No.: WO2015/012282
PCT Pub. Date: Jan. 29, 2015

(65) Prior Publication Data
US 2016/0172673 A1    Jun. 16, 2016

(30) Foreign Application Priority Data
Jul. 24, 2013   (JP) .................. 2013-153897

(51) Int. Cl.
*H01M 4/525* (2010.01)
*C01G 53/00* (2006.01)
(Continued)

(52) U.S. Cl.
CPC ............ *H01M 4/505* (2013.01); *C01G 53/50* (2013.01); *H01M 4/366* (2013.01); *H01M 4/525* (2013.01);
(Continued)

(58) Field of Classification Search
None
See application file for complete search history.

(56) References Cited

U.S. PATENT DOCUMENTS

2001/0016284 A1 * 8/2001 Kweon ............. C01G 45/1242
429/224
2003/0170540 A1 * 9/2003 Ohzuku ................ H01M 4/362
429/231.1
(Continued)

FOREIGN PATENT DOCUMENTS

CN    1430298 A    7/2003
CN    1482699 A    3/2004
(Continued)

OTHER PUBLICATIONS

Zhou et al. (The Physical Meanings of 5 Basic Parameters for an X-Ray Diffraction Peak and Their Application, Chinese Journal of Geochemistry, vol. 22, No. 1, 2003, pp. 38-44 ) (Year: 2003).*
(Continued)

*Primary Examiner* — Ula C Ruddock
*Assistant Examiner* — Anna Korovina
(74) *Attorney, Agent, or Firm* — Katten Muchin Rosenman LLP

(57) ABSTRACT

A cathode active material for a non-aqueous electrolyte secondary battery has improved output characteristics in
(Continued)

low-temperature environment use. A lithium mixture includes composite hydroxide particles and a lithium compound calcined in an oxidizing atmosphere under a temperature rising time from 650° C. to a calcination temperature set to 0.5-1.5 hours and the calcination temperature set to 850° C.-1000° C. and maintained for 1.0-5.0 hours. The material has the general formula (A): $Li_{1+s}Ni_xCo_yMn_zM_tO_2$, where $-0.05 \leq s \leq 0.20$, $x+y+z+t=1$, $0.3 \leq x \leq 0.7$, $0.1 \leq y \leq 0.4$, $0.1 \leq z \leq 0.4$, $0 \leq t \leq 0.05$, and M is selected from Ca, Mg, Al, Ti, V, Cr, Zr, Nb, Mo, Hf, Ta, and W. The material includes hexagonal lithium composite oxide particles. The ratio of the crystallite size at plane (104) to plane (003) is greater than 0 and less than 0.60.

11 Claims, 2 Drawing Sheets

(51) Int. Cl.
   *H01M 4/02*       (2006.01)
   *H01M 4/36*       (2006.01)
   *H01M 4/505*      (2010.01)
   *H01M 10/052*     (2010.01)
   *H01M 10/0525*    (2010.01)

(52) U.S. Cl.
   CPC ..... *H01M 10/052* (2013.01); *H01M 10/0525* (2013.01); *C01P 2002/50* (2013.01); *C01P 2002/74* (2013.01); *C01P 2004/61* (2013.01); *C01P 2006/12* (2013.01); *C01P 2006/40* (2013.01); *H01M 2004/028* (2013.01); *Y02T 10/70* (2013.01)

(56) References Cited

U.S. PATENT DOCUMENTS

| | | | |
|---|---|---|---|
| 2004/0126660 A1 | 7/2004 | Ohzuku et al. | |
| 2005/0142442 A1 | 6/2005 | Yuasa et al. | |
| 2005/0271944 A1* | 12/2005 | Suhara | H01M 4/131 429/231.1 |
| 2008/0032199 A1 | 2/2008 | Ohzuku et al. | |
| 2008/0268347 A1* | 10/2008 | Ohzuku | H01M 4/505 429/322 |
| 2009/0029253 A1 | 1/2009 | Itou et al. | |
| 2009/0299922 A1* | 12/2009 | Malcus | H01M 4/525 705/500 |
| 2010/0159332 A1* | 6/2010 | Sugiura | C01G 51/50 429/231.8 |
| 2010/0209771 A1* | 8/2010 | Shizuka | H01M 4/5815 429/231.95 |
| 2011/0053004 A1* | 3/2011 | Saruwatari | H01M 4/485 429/342 |
| 2011/0127463 A1 | 6/2011 | Yuasa et al. | |
| 2011/0193013 A1 | 8/2011 | Paulsen et al. | |
| 2012/0009476 A1 | 1/2012 | Park et al. | |
| 2012/0145954 A1 | 6/2012 | Endo et al. | |
| 2012/0248388 A1 | 10/2012 | Nagai et al. | |
| 2012/0270107 A1 | 10/2012 | Toya et al. | |
| 2012/0276454 A1 | 11/2012 | Mori et al. | |
| 2012/0292562 A1* | 11/2012 | Kajiya | H01M 4/485 252/182.1 |
| 2013/0078520 A1* | 3/2013 | Toya | H01M 4/131 429/223 |
| 2013/0101900 A1 | 4/2013 | Nagai | |
| 2013/0108921 A1 | 5/2013 | Kase et al. | |
| 2013/0130090 A1 | 5/2013 | Takamori et al. | |
| 2013/0260248 A1 | 10/2013 | Seki et al. | |
| 2013/0313471 A1 | 11/2013 | Endo et al. | |
| 2014/0011090 A1 | 1/2014 | Toya et al. | |
| 2014/0162119 A1 | 6/2014 | Takei et al. | |
| 2014/0205901 A1 | 7/2014 | Nagai et al. | |
| 2014/0232182 A1 | 8/2014 | Kinomura et al. | |
| 2015/0010821 A1 | 1/2015 | Makimura et al. | |
| 2015/0093641 A1 | 4/2015 | Mitsumoto et al. | |
| 2015/0340683 A1* | 11/2015 | Hamano | C01G 53/42 429/223 |
| 2015/0364761 A1 | 12/2015 | Fukui et al. | |
| 2017/0054147 A1 | 2/2017 | Yokoyama et al. | |

FOREIGN PATENT DOCUMENTS

| | | | |
|---|---|---|---|
| CN | 102119128 A | 7/2011 | |
| CN | 102725232 A | 10/2012 | |
| CN | 102754251 A | 10/2012 | |
| EP | 1 391 950 A1 | 2/2004 | |
| EP | 2144314 A2 * | 1/2010 | ......... C01G 45/1228 |
| EP | 2469630 | 6/2012 | |
| JP | H05258751 | * 10/1993 | |
| JP | H05258751 A | 10/1993 | |
| JP | H08055624 A | 2/1996 | |
| JP | H09022693 A | 1/1997 | |
| JP | 10069910 A | * 3/1998 | |
| JP | H10308218 A | 11/1998 | |
| JP | 2000-195514 A | 7/2000 | |
| JP | 2003-077460 A | 3/2003 | |
| JP | 2004-335278 A | 11/2004 | |
| JP | 2005-197004 A | 7/2005 | |
| JP | 2007-123255 A | 5/2007 | |
| JP | 201086690 A | 4/2010 | |
| JP | 2012-3948 A | 1/2012 | |
| JP | 2012-18925 A | 1/2012 | |
| JP | 4894969 B1 * | 3/2012 | ............. C01G 53/00 |
| JP | 2012054240 A | 3/2012 | |
| JP | 2012195239 A | 10/2012 | |
| JP | 2012201539 A | 10/2012 | |
| JP | 2012-252964 A | 12/2012 | |
| JP | 2013-51172 A | 3/2013 | |
| JP | 2013-051772 A | 3/2013 | |
| JP | 2013-134822 A | 7/2013 | |
| JP | 2013-206552 A | 10/2013 | |
| JP | 2014-135273 | 7/2014 | |
| WO | 02/086993 A1 | 10/2002 | |
| WO | 2011/074058 | 6/2011 | |
| WO | 2011067935 A1 | 6/2011 | |
| WO | 2011067937 | 6/2011 | |
| WO | 2011122448 A1 | 10/2011 | |
| WO | 2011/161755 | 12/2011 | |
| WO | 2012/091015 A1 | 7/2012 | |
| WO | 2012/131881 | 10/2012 | |
| WO | 2012/169274 | 12/2012 | |
| WO | 2013031478 A1 | 3/2013 | |
| WO | 2013/098624 A1 | 7/2013 | |
| WO | 2014001898 A1 | 1/2014 | |
| WO | 2015/163273 A1 | 10/2015 | |

OTHER PUBLICATIONS

Fujimori et al., JP 10069910 machine translation (Year: 1998).*
Furukawa et al. (JPH05258751) machine translation (Year: 1993).*
Office Action dated Mar. 30, 2017, from the corresponding Chinese Application No. 201480041971.9.
International Search Report and Written Opinion dated Sep. 16, 2014, from the corresponding PCT/JP2014/069371.
Non-Final Office Action dated Nov. 30, 2017, from corresponding U.S. Appl. No. 14/907,089.
Office Action dated Mar. 15, 2017, from the corresponding Chinese Application No. 201480040647.5.
Extended European Search Report dated Aug. 22, 2016 for the Corresponding European Patent Application No. 14830084.1.
International Search Report and Written Opinion dated Sep. 16, 2014, from the corresponding PCT/JP2014/069372.
The First Office Action dated Mar. 17, 2017, from the corresponding CN201480045922.2.
International Search Report and Written Opinion dated Nov. 25, 2014, from the corresponding PCT/JP2014/069374.
Requirement for Restriction/Election dated Sep. 7, 2017, from corresponding U.S. Appl. No. 14/907,089.

(56) References Cited

OTHER PUBLICATIONS

Non-Final Office Action dated Jan. 9, 2017, from corresponding U.S. Appl. No. 14/907,005.
Notice of Allowance dated Jun. 2, 2017, from corresponding U.S. Appl. No. 14/907,005.
Notice of Allowance dated Jun. 26, 2017, from corresponding U.S. Appl. No. 14/907,005.
Final Office Action dated Jul. 5, 2018, from U.S. Appl. No. 14/907,089.
Office Action dated Aug. 2, 2019, from U.S. Appl. No. 14/907,089.
Office Action dated Nov. 27, 2019, from U.S. Appl. No. 14/907,089.
Office Action dated Aug. 27, 2020, from U.S. Appl. No. 14/907,089.
Final Office Action dated Feb. 10, 2021, from U.S. Appl. No. 14/907,089, 19 sheets.
Office Action dated Sep. 1, 2021, from U.S. Appl. No. 14/907,089, 19 sheets.
Robinson et al., "Surface X-ray Diffraction," Rep. Prog. Phys., 1992, 55:599-651.
Grazing incidence diffraction. (Feb. 22, 2022) Wikipedia. https://en.wikipedia.org/wiki/Grazing_incidence_diffraction.

* cited by examiner

CATHODE ACTIVE MATERIAL FOR NON-AQUEOUS ELECTROLYTE SECONDARY BATTERY AND MANUFACTURING METHOD FOR SAME, AND NON-AQUEOUS ELECTROLYTE SECONDARY BATTERY

TECHNICAL FIELD

The present invention relates to a cathode active material for a non-aqueous electrolyte secondary battery and manufacturing method thereof, and to a non-aqueous electrolyte secondary battery that uses that cathode active material as cathode material.

BACKGROUND ART

In recent years, with the spread of portable electronic devices such as portable telephones, notebook personal computers and the like, there is a large need for development of compact and lightweight secondary batteries having a high energy density. Moreover, there is a large need for high-output secondary batteries as the batteries for power supplies of motor drives, and particularly for power supplies for transport equipment.

As a secondary battery that satisfies such a demand is a lithium-ion secondary battery that is one kind of a non-aqueous electrolyte secondary battery. This lithium-ion secondary battery includes an anode, a cathode, an electrolyte and the like, and a material for which extraction and insertion of lithium is possible is used as the active material that is used as the material for the anode and cathode.

Currently, much research is being performed for various kinds of lithium-ion batteries, and of that research, a lithium-ion secondary battery in which a layered-type or spinel-type lithium composite metal oxide is used as the cathode material is capable of obtaining a high 4V class voltage, so application as a battery having high energy density is being advanced.

Currently, as the cathode material for this kind of lithium-ion secondary battery, lithium composite oxides such as lithium cobalt composite oxide ($LiCoO_2$) for which synthesis is comparatively easy, lithium nickel composite oxide ($LiNiO_2$) in which nickel that is less expensive than cobalt is used, lithium nickel cobalt manganese composite oxide ($LiNi_{1/3}Co_{1/3}Mn_{1/3}O_2$), lithium manganese composite oxide ($LiMn_2O_4$) that uses manganese, lithium nickel manganese composite oxide ($LiNi_{0.5}Mn_{0.5}O_2$), and the like are proposed. Of these, lithium nickel cobalt manganese composite oxide is gaining attention as a cathode material that has good cycling characteristics, low resistance, and from which high output can be obtained. Moreover, tests for increasing the performance by introducing various additional elements into this lithium nickel cobalt manganese composite oxide are being performed.

On the other hand, research that focuses on the crystalline form of these kinds of lithium composite oxides is also being performed. For example, JP H05258751 (A), JP H09022693 (A) and JP 1108055624 (A) disclose a lithium composite oxide for which the cycling characteristics have been improved by regulating the ratio of the diffraction peak intensity ($H_{(003)}$) on plane (003) and the diffraction peak intensity ($H_{(104)}$) on plane (104) of the Miller indices (hkl) in powder X-ray diffraction that uses CuKα rays to be within a specified range.

Moreover, JP 1110308218 (A) proposes a lithium composite oxide for which it is possible to obtain both improved thermal stability and cycling characteristics when charging the lithium-ion secondary battery by regulating the crystallite diameter that is calculated from plane (003) using the Shellar formula and the crystallite diameter that is calculated from plane (110) using the Shellar formula to be within a specified range.

Furthermore, JP 2000195514 (A) proposes lithium cobalt manganese composite oxide of a trigonal system having layer structure for which the growth direction of crystal is controlled, and large-current discharge is improved by regulating the ratio of the full width at half maximum ($FWHM_{(003)}$) of the diffraction peak on plane (003) with respect to the full width at half maximum ($FWHM_{(104)}$) of the diffraction peak on plane (104) ($FWHM_{(103)}/FWHM_{(104)}$), and the ratio of the integrated intensity ($I_{(104)}$) of the diffraction peak on plane (104) with respect to the integrated intensity ($I_{(003)}$) of the diffraction peak on plane (003) ($I_{(104)}/I_{(003)}$) to be within specified ranges.

In these documents, even though the cycling characteristics and thermal stability of the obtained lithium-ion secondary battery are improved by regulating the full width at half maximum and crystallite diameter on a specified crystal plane of lithium composite oxide, improvement of the output characteristics, and particularly, improvement of the output characteristics in a low-temperature environment has not been examined. It is known that in a low-temperature environment that the output characteristics of a lithium-ion secondary battery greatly decrease, and it is considered difficult for the technology of these documents to be adapted to use in such a condition. On the other hand, with the recent worldwide spread of portable electronics and electric automobiles, it is presumed that lithium-ion batteries that are used in these devices will be used in severe environments such as in cold regions, so there is a need for further improvement of the output characteristics in low-temperature environments.

For example, JP 2005197004 (A) proposes a cathode active material that is a layered lithium nickel manganese composite of which the ratio of the diffraction peak intensity ($H_{(003)}$) on plane (003) and the diffraction peak intensity ($H_{(104)}$) on plane (104) is controlled to be 1.0 to 1.5, and the specific surface area is controlled to be 0.6 $m^2$/g to 1.5 $m^2$/g and that can be expressed by the general formula: $Li_aMn_xNi_yCo_zO_2$ (where $0<a\leq1.2$, $0.1\leq x\leq0.9$, $0\leq y\leq0.44$, $0.1\leq z\leq0.6$, $x+y+z=1$), and has high lithium-ion conductivity and for which an increase in internal battery resistance can be suppressed even in a low-temperature environment of −30° C. In this document, it is disclosed that this kind of lithium nickel manganese composite oxide can be obtained by calcination of small particle size raw material for 10 to 50 hours at 950° C., and preferably at 1000° C. to 1100° C.

Moreover, JP 2013051772 (A) proposes a lithium-ion secondary battery that is capable of high-output characteristics even in extremely low-temperature environments such as at −30° C. in a low-charged state by making the cathode active material have a hollow structure and controlling the $FWHM_{(003)}/FWHM_{(104)}$ value to be 0.7 or less. In this document, it is disclosed that this kind of cathode active material can be obtained by mixing a crystallized transition metal hydroxide with a lithium compound under specified conditions, then performing calcination in an oxidizing atmosphere for 3 hours to 20 hours at a maximum calcination temperature of 700° C. to 1000° C.

Therefore, by using these cathode active materials, it is thought to be possible to increase the output of the secondary battery, and lower the cathode resistance at extremely low temperatures (about −30° C.). However, the diffraction peak intensity is only quantitatively evaluated for a target crystal plane, and it is not possible to sufficiently evaluate the crystallinity that has an important effect on the output characteristics. Moreover, the full width at half maximum (FWHM) is an evaluation of the relative crystallinity of a crystal plane and is not a quantitative evaluation, so with only this evaluation, highly reliable evaluation is difficult. Therefore, even when these cathode materials are used, improvement of the output characteristics in extremely low-temperature environments (about −30° C.) where the output characteristics of a non-aqueous electrolyte secondary battery decrease is still not sufficient, and further improvement is desired.

RELATED LITERATURE

Patent Literature

[Patent Literature 1] JP H05258751 (A)
[Patent Literature 2] JP H09022693 (A)
[Patent Literature 3] JP H08055624 (A)
[Patent Literature 4] JP H10308218 (A)
[Patent Literature 5] JP 2000195514 (A)
[Patent Literature 6] JP 2005197004 (A)
[Patent Literature 7] JP 2013051772 (A)

SUMMARY OF INVENTION

Problem to be Solved by Invention

An object of the present invention is to provide a cathode active material for a non-aqueous electrolyte secondary battery that is capable of improving the output characteristics of a lithium-ion secondary battery, and particularly the output characteristics when used in a low-temperature environment. Moreover, an object of the present invention is to provide a method for easily producing this kind of cathode active material on an industrial scale.

Means for Solving Problems

The cathode active material for a non-aqueous electrolyte secondary battery of the present invention is expressed by a general formula (A): $Li_{1+a}Ni_xCo_yMn_zM_tO_2$ (where $-0.05 \leq a \leq 0.20$, $x+y+z+t=1$, $0.30 \leq x \leq 0.70$, $0.10 \leq y \leq 0.40$, $0.10 \leq z \leq 0.40$, $0 \leq t \leq 0.01$, and M is one or more element selected from among Ca, Mg, Al, Ti, V, Cr, Zr, Nb, Mo, Hf, Ta, and W), and includes layered hexagonal crystal lithium nickel cobalt manganese composite oxide particles; and the ratio of the integrated width of the diffraction peak on plane (104) with respect to the integrated width of the diffraction peak on plane (003) of the Miller indices (hkl) in powder X-ray diffraction that uses CuKα rays is 1.38 or greater, and preferably 1.39 to 1.49.

Preferably, this cathode active material for a non-aqueous electrolyte secondary battery is such that the ratio of the peak integrated intensity on plane (003) with respect to the peak integrated intensity on plane (104) of the Miller indices (hkl) in powder X-ray diffraction that uses CuKα rays is 1.20 or greater.

Moreover, preferably, the volume-average particle size that is found by a laser diffraction and scattering method is within the range 3 μm to 20 μm, and/or the specific surface area is within the range 0.3 m²/g to 2.5 m²/g.

The manufacturing method for a cathode active material for a non-aqueous electrolyte secondary battery of the present invention comprises: a mixing process for obtaining a lithium mixture by mixing a lithium compound with nickel cobalt manganese composite hydroxide particles that are expressed by a general formula (B): $Ni_xCo_yMn_zM_t(OH)_{2+\alpha}$ (where $x+y+z+t=1$, $0.30 \leq x \leq 0.70$, $0.10 \leq y$ $0.40$, $0.10 \leq z \leq 0.40$, $0 \leq t \leq 0.01$, and M is one or more element selected from among Mg, Ca, Al, Ti, V, Cr, Zr, Nb, Mo, Hf, Ta, and W) so that the ratio of the number of atoms of lithium with respect to the total number of atoms of metal elements other than lithium is 1:0.95 to 1.20; and a calcination process of performing calcination of the lithium mixture in an oxidizing atmosphere where the rate of temperature rise in at least the temperature range from 30° C. to 800° C. is 4° C./min to 10° C./min, the calcination temperature is 800° C. to 1000° C., the maintenance time at the calcination temperature is 5 hours or less, and time from the start of temperature rise to the end of the maintenance time is 3.0 hours to 7 hours.

Preferably, there is a heat-treatment process before the mixing process for heat treating the nickel cobalt manganese composite hydroxide particles to 105° C. to 400° C. to obtain heat-treated particles.

Preferably, lithium carbonate, lithium hydroxide or a mixture of these is used as the lithium compound.

Preferably, the oxygen concentration in the oxidizing atmosphere is 10% by volume to 100% by volume.

Preferably, there is a crushing process after the calcination process for crushing the lithium nickel cobalt manganese composite particles that were obtained in the calcination process.

The non-aqueous electrolyte secondary battery of the present invention comprises a cathode, an anode, a separator, and a non-aqueous electrolyte, and uses the above cathode active material for a non-aqueous electrolyte as the cathode material of the cathode. Particularly, in the present invention, the initial discharge capacity is 150 mAh/g or greater, and the extremely low-temperature output at −30° C. is 110 W or greater.

Effect of Invention

With the present invention, it is possible to provide a non-aqueous electrolyte secondary battery that has high capacity and excellent output characteristics in low-temperature environments. This kind of secondary battery can be suitably used in compact secondary batteries that are mounted in portable electronic devices such as portable telephones, notebook computers and the like, and in power supplies for power tools, and electric automobiles such as hybrid vehicles.

Moreover, with the present invention, it is possible to provide a non-aqueous electrolyte secondary battery having excellent characteristics as described above using a simple and large-scale manufacturing method thereof.

MODES FOR CARRYING OUT INVENTION

Figure 1:
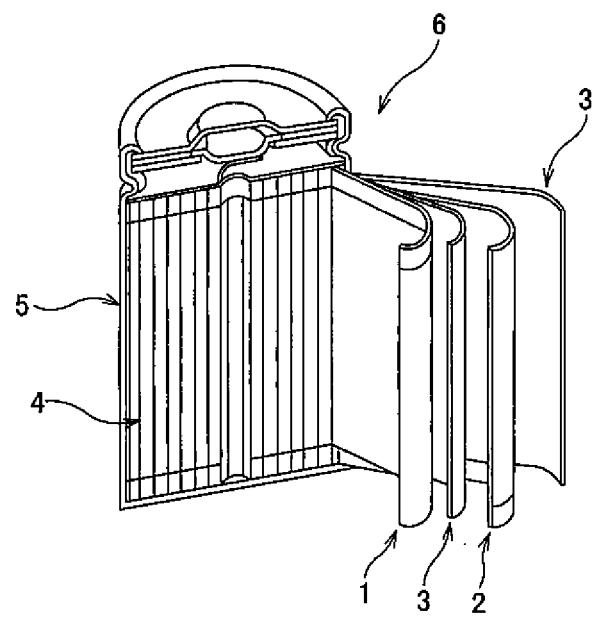
FIG. 1 schematically illustrates the cross section of a cylindrical shaped lithium-ion secondary battery that was used the present invention in battery evaluation.

The inventors of the present invention diligently performed research for solving the problems above. As a result, knowledge was gained that the crystalline form of a lithium nickel cobalt manganese composite oxide that is identified by the ratio of the integrated width of the diffraction peak on plane (104) with respect to the integrated width of the diffraction peak on plane (003) of the Miller indices (hkl) in powder X-ray diffraction that uses CuKα rays has correlation with the output characteristics of in a extremely low-temperature environment of a lithium-ion secondary battery that uses this lithium nickel cobalt manganese composite oxide. Moreover, the growth process of lithium nickel cobalt manganese composite oxide crystals was studied in detail, and as a result, it was learned that the direction of growth of the crystals can be controlled by controlling the calcination conditions. The present invention was obtained based on this knowledge.

1. Cathode Active Material for Non-aqueous Electrolyte Secondary Battery

The cathode active material for a non-aqueous electrolyte secondary battery of the present invention (hereafter, referred to as "cathode active material") is expressed by the general formula (A): $Li_{1+a}Ni_xCo_yMn_zM_tO_2$ (where $-0.05 \leq a \leq 0.20$, $x+y+z+t=1$, $0.30 \leq x \leq 0.70$, $0.10 \leq y \leq 0.40$, $0.10 \leq z \leq 0.40$, $0 \leq t \leq 0.01$, and M is one or more element selected from among Ca, Mg, Al, Ti, V, Cr, Zr, Nb, Mo, Hf, Ta, and W), and includes layered hexagonal crystal lithium nickel cobalt manganese composite oxide particles (hereafter, referred to as "lithium composite oxide particles"), and the ratio of the integrated width of the diffraction peak on plane (104) with respect to the integrated width of the diffraction peak on plane (003) of the Miller indices (hkl) in powder X-ray diffraction that uses CuKα rays is 1.38 or greater, and preferably 1.39 to 1.49.

(1) Composition

The cathode active material of the present invention includes lithium composite oxide particles. The composition of the lithium composite oxide particles is expressed by the general formula (A) above.

The value of 'a' expresses the excess amount of lithium (Li) and is −0.05 or greater and 0.20 or less, and preferably is 0 or greater and 0.18 or less, and even more preferably is 0 or greater and 0.15 or less. When the value of "a" is less than −0.05, the cathode resistance of the non-aqueous electrolyte secondary battery that uses this cathode active material becomes large, and the output of the battery becomes low. On the other hand, when the value of "a" is greater than 0.20, the initial electric discharge capacity of the non-aqueous electrolyte secondary battery that uses this cathode active material decreases.

Nickel (Ni) is an element that contributes to the improvement of battery capacity. The value of "x" that expresses the nickel content is 0.30 or more and 0.70 or less, and preferably is 0.30 or greater and 0.65 or less, and even more preferably is 0.33 or greater and 0.60 or less. When the value of "x" is less than 0.30, the battery capacity of the non-aqueous electrolyte secondary battery that uses this cathode active material decreases. On the other hand, when the value of "x" is greater than 0.70, the content of other additional elements decreases, so there is a possibility that the effect from adding elements cannot be sufficiently obtained.

Cobalt is an element that contributes to improvement of cycling characteristics. By including a proper amount of cobalt, the cathode active material has good cycling characteristics, or in other words, high durability. The value "y" that expresses the cobalt content is 0.10 or greater and 0.40 or less, and preferably is 0.10 or greater and 0.35 or less, and even more preferably is 0.15 or greater and 0.35 or less. When the value of "y" is less than 0.10, it is not possible to obtain sufficient cycling characteristics, and capacity retention decreases. On the other hand, when the value of "y" is greater than 0.40, the initial electric discharge capacity greatly decreases.

Manganese (Mn) is an element that contributes to the improvement of thermal stability. The value "z" that expresses the manganese content is 0.10 or greater and 0.40 or less, and preferably is 0.10 or greater and 0.35 or less, and even more preferably is 0.15 or greater and 0.35 or less. When the value of "z" is less than 0.10, the effect of adding manganese cannot be sufficiently obtained. On the other hand, when the value of "z" is greater than 0.40, the amount of eluted manganese during high-temperature operation increases, and the cycling characteristics decrease.

In addition, the cathode active material of the present invention can also include additional element (M) in the lithium composite oxide particles. As a result, it is possible to improve the durability and output characteristics of a secondary battery that uses this cathode active material.

As such additional elements (M), it is possible to use one or more element that is selected from among calcium (Ca), magnesium (Mg), aluminum (Al), titanium (Ti), vanadium (V), chromium (Cr), zirconium (Zr), niobium (Nb), molybdenum (Mo), halfnium (Hf), tantalum (Ta), and tungsten (W). These additional elements (M) are appropriately selected according to the usage and desired performance of the secondary battery that uses the obtained cathode active material.

The value of "t" that expresses the content of additional elements (M) is 0 or greater and 0.01 or less, and preferably is greater than 0.0003 and 0.01 or less, and more preferably is greater than 0.0005 and 0.008 or less, and even more preferably is greater than 0.001 and 0.007 or less. When the value of "t" is 0.0003 or less, it is not possible to sufficiently obtain the effect of improving the durability and output characteristics of the secondary battery that uses this cathode active material. On the other hand, when the value of "t" is greater than 0.01, the metal elements that contribute to the Redox reaction decrease, so the battery capacity decreases.

In a crystallization process that will be described later, the additional elements (M) are crystallized together with the nickel, cobalt and manganese, and can be evenly dispersed in the nickel cobalt manganese composite hydroxide particles (hereafter, referred to as "composite hydroxide particles"), however, it is also possible to cover the surface of the composite hydroxide particles with the additional elements (M) after the crystallization process. Moreover, it is also possible to mix the composite hydroxide particles with the lithium compound in a mixing process, and it is also possible to use these methods together. In the case of using any of the methods, the content of the additional elements (M) must be adjusted so as to obtain the composition of general formula (A).

(2) Integrated Width Ratio

The cathode active material of the present invention includes layered hexagonal crystal lithium composite oxide particles, and the ratio (integrated width ratio) of the integrated width of the diffraction peak on plane (104) with respect to the integrated width of the diffraction peak on plane (003) of the Miller indices (hkl) in powder X-ray diffraction that uses CuKα rays is 1.38 or greater. In other words, when the integrated width of the diffraction peak on plane (003) of the Miller indices (hkl) in powder X-ray diffraction that uses CuKα rays is taken to be $W_{(003)}$, and the integrated width of the diffraction peak on plane (104) is taken to be $W_{(104)}$, the integrated width ratio is given as follows.

Integrated width ratio: $1.38 \leq W_{(104)}/W_{(003)}$. Here, the integrated widths $W_{(104)}$ and $W_{(003)}$ are values found by dividing the integrated intensities (peak integrated intensities) at the diffraction peaks on plane (003) and plane (104) of the Miller indices (hkl) in powder X-ray diffraction that uses CuKα rays by the peak intensities at the diffraction peaks (diffraction peak intensities) (W=peak integrated intensity/ diffraction peak intensity).

In a layered hexagonal crystal oxide such as the lithium nickel cobalt manganese composite oxide (hereafter, referred to as the "lithium composite oxide"), the insertion and extraction of lithium ions during electric charging and discharging is known to be performed in the a-axis direction that is orthogonal to the c-axis. On the other hand, in order to improve the output characteristics, a short diffusion length for the lithium ions is advantageous. Particularly, in an extreme low-temperature state in which the diffusion becomes slow, it is thought that the contribution of the diffusion length on the output characteristics is large. Therefore, growth proceeding in the a-axis direction more than in the c-axis direction is disadvantageous for the output characteristics.

Here, $W_{(104)}$ represents crystal growth in the a-axis direction and c-axis direction, and $W_{(003)}$ represents crystal growth in the c-axis direction, so it can be understood that $W_{(104)}/W_{(003)}$ mostly represents crystal growth in the c-axis direction. Moreover, the smaller the values of $W_{(104)}$ and $W_{(003)}$ are means that crystal growth is proceeding. As a result, the larger $W_{(104)}/W_{(003)}$ means that crystal growth in the a-axis direction is suppressed, and crystal growth in the c-axis direction is proceeding. Therefore, when $W_{(104)}/W_{(003)}$ is large, the diffusion length for lithium ions becomes short, and the output characteristics at low temperature can be presumed to be high.

In other words, when $W_{(104)}/W_{(003)}$ is 1.38 or greater, the value of $W_{(104)}$, which is an indicator of crystal growth in the a-axis and c-axis direction, becomes relatively large, and the value of $W_{(003)}$, which is an indicator of crystal growth in the c-axis direction, becomes relatively small, so crystal growth in the a-axis direction that is orthogonal to the c-axis is suppressed, and it is possible to obtain high output characteristics. As a result, it is possible to obtain a secondary battery having high output characteristics in the −30° C. extremely low-temperature state. This kind of result becomes remarkable in the −30° C. extremely low-temperature state, however, in order to obtain an even higher effect, $W_{(104)}/W_{(003)}$ is preferably 1.39 or greater, and more preferably 1.40 or greater. However, when $W_{(104)}/W_{(003)}$ becomes too large, there is a possibility that the crystallinity will become unstable, and that the battery characteristics will worsen. Therefore, taking into consideration restrictions on production and the like, the upper limit value is preferably 1.51 or less, and more preferably 1.49 or less, and even more preferably 1.48 or less.

In JP 200195514 (A) and JP 2013051172 (A), the full width at half maximum (FWHM) for the diffraction peak is used when evaluating crystal growth. However, as was described above, the full width at half maximum (FWHM) is the relative crystallinity between crystal surfaces and is not a quantitative value, so sufficient reliability cannot be obtained. Moreover, there is also a problem in that due to the relationship with the resolution, variation in the peak shape becomes large. In regard to this, when evaluating the integrated width (W) that includes much information about surface indices that identify crystal growth, as in the present invention, this kind of problem does not occur, and it is possible to find a highly reliable correlation.

(3) Peak Integrated Intensity Ratio

In the cathode active material of the present invention, together with controlling the integrated width ratio as described above, the ratio of the peak integrated intensity ($I_{(003)}$) on plane (003) and the peak integrated intensity ($I_{(104)}$) on plane (104) in powder X-ray diffraction that uses CuKα rays (peak integrated intensity ratio; $I_{(003)}/I_{(104)}$) is preferably controlled to be 1.20 or greater, or is more preferably controlled to be 1.22 to 1.35, and is even more preferably controlled to be 1.23 to 1.28. The peak integrated intensity is an indicator of crystal growth, and by controlling the peak integrated intensity ratio to be within the range described above, it is possible to suppress crystal growth in the a-axis direction that is orthogonal to the c-axis, so it is possible to further improve the output characteristics.

In regard to this, when the peak integrated intensity ratio is less than 1.20, there is a possibility that the crystallinity will become insufficient, and that the battery characteristics such as the capacity or cycling retention will decrease. Even though it is preferred that crystal growth in the c-axis direction proceeds, when the peak integrated intensity ratio becomes too large, there is a possibility that a problem of a heterogeneous phase being formed will occur. Therefore, the peak integrated intensity ratio is preferably 1.35 or less.

(4) Particle Structure

The cathode active material of the present invention includes spherical shaped secondary particles that are formed by an aggregation of plural primary particles (lithium composite oxide particles). The shape of the primary particles of the secondary particles can take on various shapes such as plate shaped, needle shaped, rectangular parallelepiped shaped, elliptical shaped, polyhedron shaped and the like. The aggregate form as well can be aggregation in a random direction, or the present invention can also be applied to the case of aggregation in the major axis direction of the particles from the center in a fan-like shape. However, in order to improve the packing density of the cathode active material obtained, preferably the primary particles have a spherical shape.

Moreover, the cathode active material of the present invention has interfaces or grain boundaries between the primary particles of the secondary particles through which electrolyte can penetrate. Therefore, it is possible for electrolyte to penetrate to the surface of the primary particles where insertion and extraction of lithium ions is performed, and due to the synergistic effect of controlling the integrated width ratio and peak integrated intensity ratio described above, it is possible to greatly improve the output characteristics. These kinds of secondary particles have as a precursor composite hydroxide particles that are obtained in a crystallization process that will be described layer, and can be easily produced.

(5) Average Particle Size

The average particle size of the cathode active material of the present invention is preferably 3 μm to 20 μm. Here, the average particle size means the volume-average particle size (MV) that is found by the laser diffraction scattering method.

When the average particle size is less than 3 μm, the packing density of the cathode active material decreases, and thus the battery capacity per volume of the cathode may decrease. Moreover, there may be excessive reaction with the electrolyte, and thus safety may decrease. On the other hand, when the average particle size is greater than 20 μm the specific surface area of the cathode active material decreases and the boundary surfaces with the electrolyte are reduced, so the cathode resistance may rise and the output characteristics of the secondary battery may decrease. As the battery capacity per unit volume is increased, excellent battery characteristics such as a high-level of safety and high output are obtained, so from this aspect, preferably the average particle size is 5 μm to 15 μm.

(6) Specific Surface Area

The specific surface area of the cathode active material of the present invention is preferably 0.3 m$^2$/g to 2.5 m$^2$/g, and more preferably 0.5 m$^2$/g to 2.0 m$^2$/g. When the specific surface area is less than 0.3 m$^2$/g, it may not be possible to sufficiently maintain the reaction surface area with the electrolyte. On the other hand, when the specific surface area is greater than 2.5 m$^2$/g, there may be excessive reaction with the electrolyte, and thus safety may decrease. The specific surface area can be measured by the BET method using nitrogen gas adsorption.

2. Method for Producing Cathode Active Material for Non-Aqueous Electrolyte Secondary Battery The method for producing the cathode active material of the present invention includes: a mixing process of obtaining a lithium mixture by adding a lithium compound to nickel cobalt manganese composite hydroxide particles (hereafter, referred to as "composite hydroxide particles") and mixing; and a calcination process of obtaining lithium composite oxide particles by performing calcination of the lithium mixture in an oxidizing atmosphere. However, in order to make the characteristics of the obtained cathode active material even higher, preferably the method additionally includes a specified crystallization process, a heat-treatment process and/or a crushing process.

(1) Crystallization Process

In the present invention, as the precursor for the cathode active material, it is possible to use composite hydroxide particles that are expressed by the general formula (B): $Ni_xCo_yMn_zM_t(OH)_{2+\alpha}$ (where x+y+z+t=1, 0.30≤x≤0.70, 0.10≤y 0.40, 0.10≤z≤0.40, 0≤t≤0.01, and M is one or more element selected from among Ca, Mg, Al, Ti, V, Cr, Zr, Nb, Mo, Hf, Ta, and W).

The method for producing this kind of composite hydroxide particles is not particularly limited, and it is possible to suitably use a known method. For example, it is possible to use a method in which a mixed aqueous solution in which metal compound of nickel, cobalt, manganese and additional elements (M) are dissolved at the composition ratios expressed by general formula (B), or an aqueous solution in which an ammonium-ion donor is added to this mixed aqueous solution is supplied to a reaction tank while stirring, then forming a reaction aqueous solution by supplying a sodium hydroxide aqueous solution, controlling the pH value of that solution to be within a specified range, and crystallizing composite hydroxide particles.

With this kind of crystallization process, it is possible to make the shape of the obtained composite hydroxide particles spherical. In the present invention, it is possible to apply a continuous crystallization method or a batch-type crystallization method as this kind of crystallization method. However, from the aspect of obtaining composite hydroxide particles having a uniform particle size, preferably a batch-type crystallization method in which the nucleation stage, in which the portions that becomes the nuclei of the composite hydroxide particles, and the particle growth stage, in which the particles grow around the nuclei, are clearly separated is used.

(2) Heat-Treatment Process

In the manufacturing method of the present invention, it is also possible to arbitrarily heat treat the composite hydroxide particles after the crystallization process and before the mixing process, and then mix the lithium compound with the heat-treated particles. Here, not only composite hydroxide particles from which the excess moisture has been removed in a heat-treatment process, but also nickel cobalt manganese composite oxide particles (hereafter, referred to as "composite oxide particles") that are expressed by the general formula (C): $Ni_xCo_yMn_zM_tO_2$ (where x+y+z+t=1, 0.30≤x≤0.70, 0.10≤y 0.40, 0.10≤z≤0.40, 0≤t≤0.01, and M is one or more element selected from among Mg, Ca, Al, Ti, V, Cr, Zr, Nb, Mo, Hf, Ta, and W) that are transformed by a heat-treatment process, or a mixture of these are also included in the heat-treated particles.

The heat-treatment process is a process for removing moisture that is included in the composite hydroxide particles by heating and processing the composite hydroxide particles to a temperature of 105° C. to 400° C. As a result, moisture that remains in the particles until the calcination process can be reduced to fixed amount, so it is possible to prevent variation in the percentage of the number of atoms in each of the metal components in the obtained cathode active material and the number of lithium atoms and to stabilize the ratio of the number of lithium atoms (Li/Me).

In the heat-treatment process enough moisture is removed so that variation in the percentage of the number of atoms of each of the metal components and number of lithium atoms in the cathode active material does not occur, so it is not absolutely necessary to transform all of the composite hydroxide particles to composite oxide particles. However, in order to further reduce variation in the percentage of the number of atoms of each of the metal components and number of lithium atoms, preferably all of the composite hydroxide particles are converted to composite oxide particles by heating the particles in a condition equal to or greater than the decomposition condition for the nickel cobalt manganese composite hydroxide.

The heating temperature in the heat-treatment process is 105° C. to 400° C., and preferably 150° C. to 400° C. When the heating temperature is less than 105° C., it is not possible to remove the excess moisture in the composite hydroxide particles, so it may not be possible to sufficiently suppress variation. On the other hand, even when the heating temperature is greater than 400° C., not only can no more effect be expected, but the production cost increases. It is possible to suppress the variation described above by finding through analysis each of the metal components included in the heat-treated particles according to the heat-treatment conditions, and setting the ratio of lithium compound.

The atmosphere in which heat treatment is performed is not particularly limited as long as the atmosphere is a non-reducing atmosphere, however, preferably heat treatment is performed in a simple airflow.

Moreover, the heat-treatment time is also not particularly limited, however, when the time is less than 1 hour, it may not be possible to sufficiently remove the excess moisture in the composite hydroxide particles. Therefore, preferably the heat-treatment time is at least 1 hour or more, and more preferably 5 hours to 15 hours.

The equipment that is used in this kind of heat treatment is not particularly limited as long as it is possible to heat composite hydroxide particles in a non-reducing atmosphere and preferably in a flow of air, however, an electric furnace that does not generate gas can be suitably used.

(3) Mixing Process

The mixing process is a process for obtaining a lithium mixture by mixing a lithium compound with composite hydroxide particles or heat-treated particles so that the ratio (Li/Me) of the number of lithium atoms (Li) with respect to the total number of metal atoms (Me) is 0.95 to 1.20, and preferably 1.00 to 1.20, and more preferably greater than 1.00 and 1.15 or less. In other words, Li/Me does not change before or after the calcination process, so the lithium compound must be mixed with composite hydroxide particles or heat-treated particles so that the Li/Me ratio of the lithium mixture that is obtained in the mixing process becomes the Li/Me ratio of the target cathode active material.

The lithium compound that is used for forming the lithium mixture is not particularly limited, however, in consideration of the ease of procurement, it is suitably possible to used lithium hydroxide, lithium nitrate, lithium carbonate or a mixture of these. Particularly, when considering the ease of handling, or the stability of product quality, preferably lithium hydroxide or lithium carbonate is used, and more preferably lithium carbonate is used.

The lithium mixture is preferably mixed sufficiently before calcination. When the mixing is not sufficient, variation may occur in the Li/Me ratio among individual particles, and it may not be possible to obtain sufficient battery characteristics.

Moreover, for mixing it is possible to use a typical mixer, for example, it is possible to use a shaker mixer, a V blender, a ribbon mixer, a Julia mixer, Loedige mixer or the like. No matter what mixer is used, the composite hydroxide particles or the heat-treated particles should be sufficiently mixed to an extent that the shapes of the composite hydroxide particles or heat-treated particles are not damaged.

In the mixing process, it is also possible to mix in additional elements (M) together with the lithium compound. Alternatively, the lithium compound can be mixed in after the surface of the composite hydroxide particles or composite oxide particles have been coated with the additional elements (M). Furthermore, these methods can be used together. In any case, it is necessary that the additional elements (M) be appropriately adjusted so that the composition of general formula (A) is obtained.

(4) Calcination Process

The calcination process is a process for obtaining lithium composite oxide particles by performing calcination of the lithium mixture that was obtained in the mixing process under specified condition, and then cooling to room temperature.

Particularly, in the present invention, performing calcination by raising the temperature of the lithium mixture in an oxidizing atmosphere at a rate of temperature increase of 4° C./min to 10° C./min in the temperature range of 30° C. to 800° C., and then with the calcination temperature being 800° C. to 1000° C., maintaining the mixture at this calcination temperature for 5 hours or less so that the time from the start of temperature rise to the end of the maintained temperature is 3 hours to 7 hours has importance significance. By performing calcination under these calcination conditions, it is possible to increase crystallinity and make the ratio $W_{(104)}/W_{(003)}$ 1.38 or greater while suppressing crystal growth in the a-axis direction that is orthogonal to the c-axis in the lithium composite oxide.

The calcination furnace that is used in the calcination process is not limited as long as it is possible to control the conditions explained below. However, preferably a furnace that is capable of heating in a flow of air or oxygen is used, and more preferably the furnace is an electric furnace that does not generate gas. As long as the furnace is this kind of furnace, it is possible to suitably use a batch-type electric furnace or a continuous-type electric furnace.

[Calcination Temperature]

The calcination temperature is 800° C. to 1000° C., and preferably 830° C. to 980° C., and more preferably 840° C. to 960° C. When the calcination temperature is less than 800° C., the reaction between the composite hydroxide particles or composite oxide particles and the lithium compound is not sufficient, so an excess of lithium compound and unreacted composite hydroxide particles or composite oxide particles remains, or dispersion of lithium into the composite hydroxide particles or composite oxide particles is not sufficient, so the crystal structure does not become uniform. On the other hand, when the calcination temperature is greater than 1000° C., sintering proceeds aggressively between the generated lithium composite oxide particles, and abnormal particle growth occurs, so the particles become coarse, and it is not possible to maintain the spherical shape of the secondary particles Moreover, when the calcination temperature is less than 800° C., the average particle size of the lithium composite oxide particles becomes small, and the specific surface area becomes large. On the other hand, when the calcination temperature is greater than 1000° C., the average particle size becomes large and the specific surface area becomes small. Therefore, in either case, it is difficult to obtain a cathode active material that has both a suitable average particle sixe and specific surface area.

[Rate of Temperature Rise]

a) 30° C. to 800° C.

In the calcination process, the rate of temperature rise in at least the temperature range of 30° C. to 800° C. must be 4° C./min to 10° C./min, and preferably is 5° C./min to 9° C./min, and more preferably 5° C./min to 8° C./min. As a result, it is possible to suppress crystal growth in the a-axis direction that is orthogonal to the c-axis.

In regard to this, when the rate of temperature rise in this temperature range is less than 4° C./min, composite hydroxide particles are transformed to composite oxide particles during the temperature rise, and the reaction between the composite oxide particles and the lithium of the lithium compound proceeds, so crystal growth in the a-axis direction that is orthogonal to the c-axis proceeds. On the other hand, when the rate of temperature rise in this temperature range is greater than 10° C./min, the reaction between the composite hydroxide particles or composite oxide particles and the lithium compound is not uniform, and localized sintering between particles proceeds, so the value of the cathode resistance of the obtained secondary battery becomes high.

In the present invention, the rate of temperature rise means the average value of the rate of temperature rise (average rate of temperature rise) in the target temperature range.

b) 800° C. to Calcination Temperature

In the calcination process, the rate of temperature rise from 800° C. to the calcination temperature is not particularly limited, however, preferably is 4° C./min to 10° C./min, which is the same as the rate of temperature rise in the temperature range of 30° C. to 800° C. When the rate of temperature rise in this temperature range is less than 4° C./min, the amount of time that the temperature is maintained at 800° C. or more become too long, so crystal growth in the a-axis direction that is orthogonal to the c-axis may proceed too much. On the other hand, when the rate of temperature rise in this temperature range is greater than 10° C./min, variation may occur in the temperature of the lithium mixture, so the crystal growth may not be uniform, and the battery characteristics may decrease.

[Calcination Time]

a) Maintenance Time

The amount of time that the temperature is maintained at the calcination temperature is 5 hours or less, and preferably 4 hours or less. When the maintenance time is within this kind of range, the crystal structure of the obtained cathode active material becomes uniform, and it is possible to make the ratio $W_{(104)}/W_{(003)}$ 1.38 or greater. In regard to this, when the maintenance time is greater than 5 hours, crystal growth proceeds in the a-axis direction that is orthogonal to the c-axis. The lower limit for the maintenance time is not particularly limited as long as it is possible for the composite hydroxide particles or composite oxide particles to react sufficiently with the lithium compound, and as long as there is a sufficient reaction during the process of raising the temperature to the calcination temperature, a maintenance time does not need to be provided.

b) Time from Start of Temperature Rise to End of Maintenance Time

The amount of time from the start of the temperature rise to the end of the maintenance time (hereafter, referred to as the "overall calcination time") is 3.0 hours to 7.0 hours, and preferably 4.0 hours to 6.9 hours, and more preferably 4.5 hours to 6.5 hours. When the overall calcination time is less than 3 hours, the composite hydroxide particle or composite oxide particles do not react sufficiently with the lithium compound, and excess lithium compound and unreacted composite hydroxide particles or composite oxide particles remain, or dispersion of lithium into the composite hydroxide particles or composite oxide particles is not sufficient, so the crystal structure does not become uniform. On the other hand, when the overall calcination time is greater than 7 hours, crystal growth proceeds in the a-axis direction that is orthogonal to the c-axis.

[Calcination Atmosphere]

The atmosphere during calcination is an oxidizing atmosphere, and preferably is an atmosphere having an oxygen concentration of 18% by volume to 100% by volume, or in other words, calcination is performed in a flow of air or oxygen. From the aspect of cost, it is particularly preferred that calcination be performed in a flow of air. When the oxygen concentration is less than 18% by volume, the oxidizing reaction does not proceed sufficiently, and there is a possibility that the crystallinity of the lithium composite oxide particles that are obtained will not be sufficient.

(5) Crushing Process

In the manufacturing method of the present invention, after the calcination process, there is a crushing process for crushing the lithium composite oxide particles. The lithium composite oxide particles that were obtained in the calcination process may be aggregated together or lightly sintered together. In such a case, by crushing the aggregates or sintered bodies of lithium composite oxide particles, it is possible to easily adjust the average particle size (MV) of the obtained cathode active material to be within the suitable range of 3 μm to 20 μm. Crushing is an operation of loosening up the aggregates by applying mechanical energy to the aggregates of plural secondary particles that occurred due to sintered necking or the like between secondary particles during calcination and separating the secondary particles without destroying the particles themselves.

It is possible to use a known method as the crushing method; for example, it is possible to use a pin mill or a hammer mill. When performing the crushing process, preferably the secondary particles are adjusted to be within a suitable range without destroying the secondary particles.

3. Non-Aqueous Electrolyte Secondary Battery

Then non-aqueous electrolyte secondary battery of the present invention has components that are similar to a typical non-aqueous electrolyte secondary battery such as a cathode, an anode, a separator, a non-aqueous electrolyte and the like. The form explained below is only an example, and the non-aqueous electrolyte secondary battery of the present invention can undergo various modifications or improvements based on the form disclosed in this specification.

(1) Component Materials

[Cathode]

The cathode of the non-aqueous electrolyte secondary battery is made as described below, for example, using the cathode active material that was obtained according to the present invention.

First, an electrically conductive material and a binding agent are mixed with the powder cathode active material that was obtained according to the present invention, then as necessary, active carbon or solvent for adjusting viscosity is added, and these are all mixed to produce a cathode paste. When doing this, the ratios of components in the cathode paste are important elements for setting the performance of the non-aqueous electrolyte secondary battery. When the solid component of the cathode paste that does not include the solvent is taken to be 100 parts by mass, then, preferably, as in the case of a cathode of a typical non-aqueous electrolyte secondary battery, the content of cathode active material is taken to be 60 parts by mass to 95 parts by mass, the content of the electrically conductive material is taken to be 1 part by mass to 20 parts by mass, and the content of the binding agent is taken to be 1 part by mass to 20 parts by mass.

The obtained cathode paste is applied to the surface of an aluminum foil current collector, and then dried to evaporate the solvent. As necessary, in order to increase the electrode density, pressure may be applied using a roll press. In this way, it is possible to produce a sheet-type cathode. A sheet-type cathode can be cut to an appropriate size to correspond to the target battery, and provided for producing a battery. However, the method for producing a cathode is not limited to the example described above, and other methods can also be used.

As the electrically conductive material, it is possible to use, for example, graphite (natural graphite, artificial graphite, expanded graphite and the like), or carbon black such as acetylene black or Ketjen black.

The binding agent performs the role of binding together active material particles, and, for example, it is possible to use polyvinylidene fluoride (PVDF), polytetrafluoroethylene (PTFE), fluororubber, ethylene propylene diene rubber, styrene-butadiene, cellulose resin, and polyacrylic acid.

Moreover, as necessary, it is possible to add a solvent to the cathode material to disperse the cathode active material, electrically conductive material and active carbon, and to dissolve the binding agent. As the solvent it is possible to use an organic solvent such as N-methyl-2-pyrrolidone. It is also possible to add active carbon to the cathode material for increasing the electric double-layer capacitance.

[Anode]

An anode that is formed by mixing a binding agent with metallic lithium or lithium alloy, or anode active material that can store or release lithium ions and adding a suitable solvent to form a paste-like anode material, then applying that anode material to the surface of a metal foil, for example, copper foil current collector, then drying the material, and pressing as necessary to increase the electrode density is used as the anode.

As the anode active material, it is possible to use, for example, a powdered body of an organic composite fired body such as natural graphite, artificial graphite, and phenol resin, or of a carbon material such as coke. In this case, as in the case of the cathode, it is possible to use a fluorine-containing resin such as PVDF as the anode binding agent, and as the solvent for dispersing the active material and binding agent, an organic solvent such as N-methyl-2-pyrrolidone can be used.

[Separator]

A separator is arranged so as to be held between the cathode and the anode. The separator separates the cathode and the anode and supports an electrolyte; and for the separator is it possible to use a thin film of polyethylene, polypropylene or the like, that has many small minute holes.

[Non-Aqueous Electrolyte]

The non-aqueous electrolyte is an electrolyte in which lithium salt as a supporting electrolyte is dissolved in an organic solvent.

As the organic solvent, it is possible to use one kind or a combination of two kinds or more selected from among a cyclic carbonate such as ethylene carbonate, propylene carbonate, butylene carbonate, trifluoro propylene carbonate and the like; a chain carbonate such as diethyl carbonate, dimethyl carbonate, ethyl methyl carbonate, dipropyl carbonate and the like; an ether compound such as tetrahyrofuran, 2-methyltetrahydrofuran, dimethoxyethane and the like; a sulphur compound such as ethyl methyl sulfone, butane sulfone and the like; and a phosphorus compound such as triethyl phosphate, trioctyl phosphate and the like.

As the supporting electrolyte, it is possible to use $LiPF_6$, $LiBF_4$, $LiClO_4$, $LiAsF_6$, $LiN(CF_3SO_2)_2$, a composite salt of these and the like.

Furthermore, the non-aqueous electrolyte can also include a radical scavenger, a surfactant, flame retardant and the like.

(2) Shape and Construction of Secondary Battery

The non-aqueous electrolyte secondary battery of the present invention that includes a cathode, an anode, a separator and a non-aqueous electrolyte as described above can have various shapes such as a cylindrical shape, a layered shape and the like. No matter what shape is used, the cathode and anode are layered with a separator in between to form an electrode body, and the electrolyte is impregnated into the obtained electrode body, collector leads are used to connect between the cathode current collector and a cathode terminal that runs to the outside, and between the anode current collector and an anode terminal that runs to outside, and the components are then sealed in a battery case to complete the non-aqueous electrolyte secondary battery.

(3) Characteristics

For the non-aqueous electrolyte secondary battery that uses the cathode active material of the present invention, the output characteristics, and particularly the output characteristics during use in extremely low-temperature (−30° C.) environments are improved. For example, in the case of a cylindrical shaped lithium-ion secondary battery such as illustrated in FIG. 1 that uses the cathode active material of the present invention, the output value at −30° C. can be 110 W or greater, and preferably 114 W or greater, and more preferably 120 W or greater.

Moreover, the cylindrical shaped lithium-ion secondary battery that uses the cathode active material of the present invention is able to achieve a high initial discharge capacity of 150 mAh/g or more, and preferably 153 mAh/g or more, and more preferably 156 mAh/g or more, and because high capacity retention can be obtained even in long cycles, the battery can be said to have high capacity and long life. Furthermore, when compared with a conventional lithium cobalt composite oxide or lithium nickel composite oxide cathode active material, the battery has high thermal stability and excellent safety. Thus, by applying the present invention, an expensive protective circuit can be simplified and the miniaturization and cost reduction of the secondary battery can be achieved.

(4) Uses

The non-aqueous electrolyte secondary battery of the present invention that has the characteristics described above can be suitably used when high output characteristics are required including use in cold regions, and can be suitably used as the power source for portable electronic devices for which installation space is limited, or as the power source for transport equipment like an electric automobile. The present invention can be used not only as the power source for an electric automobile that is driven simply by electric energy, but also can be used as the power source of a so-called hybrid vehicle in which the battery is used together with a combustion engine such as a gasoline engine or diesel engine.

EXAMPLES

In the following, the present invention will be described in detail by referencing some examples and comparative examples. In all of the examples and comparative examples, specimens using special high-grade chemicals manufactured by Wako Pure Chemicals Industry, Ltd. were used for making the composite hydroxide particles, cathode active material (lithium composite oxide particles) and secondary battery.

Example 1

[Crystallization Process]

Composite hydroxide particles were produced using known crystallization technology. First, sulfates of nickel, cobalt and manganese, an aqueous mixture of a zirconium compound and tungsten compound, and an aqueous solution that includes an ammonium-ion donor were supplied to a reaction tank while mixing. By supplying a sodium hydroxide aqueous solution at the same time, a reaction aqueous solution was formed, and composite hydroxide particles were crystallized. When doing this, the amount of sodium hydroxide aqueous solution that was supplied was adjusted so that the pH value of the reaction aqueous solution was maintained within a specified range. After that, the composite hydroxide particles were collected, washed and dried to form a powder.

The composition of the composite hydroxide particles that were obtained in this way were analyzed using ICP atomic emission spectrometry equipment (ICPS-8100, manufactured by Shimadzu Corporation), and, as a result, it was confirmed that the composition was expressed by the general formula $(Ni_{0.33}Co_{0.33}Mn_{0.33})_{0.993}Zr_{0.002}W_{0.005}(OH)_{2+\alpha}$ (where $0 \le \alpha \le 0.5$).

[Heat-Treatment Process]

The composite hydroxide particles where heat treated for 12 hours at 150° C. in an air atmosphere using an electric furnace to obtain heat-treated particles.

[Mixing Process]

Lithium carbonate was added to the heat-treated particles so that Li/Me=1.14, then mixed for 20 minutes using a shaker mixer (TURBULA Type T2C, manufacture Willy A, Bachofen (WAB) AG) to obtain a lithium mixture.

[Calcination Process]

The lithium mixture that was obtained in the mixing process then underwent calcination in a flow of air (oxygen 21% by volume) at a calcination temperature of 950° C. More specifically, the mixture was heated to the calcination temperature from room temperature (30° C.) at a rate of temperature rise of 8° C./min, and after maintaining the mixture at the calcination temperature for 3 hours, was cooled to room temperature. The total calcination time from the start of the temperature rise to the end of the maintenance time was 4.9 hours.

The composition of the cathode active material that was obtained in this way was analyzed using ICP atomic emission spectrometry equipment, and, as a result, it was confirmed that the composition was expressed by the general formula: $Li_{1.14}(Ni_{0.33}Co_{0.33}Mn_{0.33})_{0.993}Zr_{0.002}W_{0.005}O_2$.

The average particle size of this cathode active material was measured using a laser diffraction and scattering type particle size distribution measuring device (Microtrac HRA, manufactured by Nikkiso Co., Ltd.) and the particle size when the volumetric integrated rate obtained by particle size distribution measurement was 50% was found, and confirmed to be 5.2 μm.

Moreover, the specific surface area was measured using a nitrogen adsorption type BET measurement device (Quantasorb QS-10, manufactured by Yuasa Ionics, Inc.), and confirmed to be 1.2 $m^2$/g.

Furthermore, powder X-ray diffraction measurement using CuKα rays was performed for this cathode active material using an X-ray diffraction device (X'Pert PRO, manufactured by PANalytical B.V.) under measurement conditions of 40 kV applied voltage, 40 mA electric current, 0.0168° step width and 20 sec cumulative time. As a result, this cathode active material was confirmed to have a layered hexagonal crystal structure.

Finally, the integrated width ratio and the peak integrated intensity ratio of this cathode active material were analyzed using powder X-ray diffraction pattern overall analysis software (JADE, produced by Rigaku Corp.), with the peak angle range for plane (003) being 17.0° to 20.0°, and the peak angle range for plane (104) being 42.5° to 46.5°, and using the Lorentz function. As a result, it was confirmed that the integrated width ratio was 1.48, and the peak integrated intensity ratio was 1.23.

[Production of Non-Aqueous Electrolyte Secondary Battery]

Next, a wound type non-aqueous electrolyte secondary battery (lithium-ion secondary battery) for evaluation as illustrated in FIG. 1. was made by the procedure described below.

a) Cathode

Carbon black as an electrically conductive material, and polyvinylidene fluoride (RVDF) as a binding agent were mixed with the cathode active material so that the mass ratios of these materials were 85:10:5, then the mixture was dissolved in a N-methyl-2-pyrrolidone (NMP) solution and a cathode paste was formed.

This cathode paste was then applied to both sides of an aluminum foil using a comma coater, heated to 100° C. and dried to obtain a cathode. Then a pressure load was applied to this cathode by a roll press, to make a cathode sheet (1) having improved electrode density.

b) Anode

Graphite as the anode active material, PVDF as the binding agent were mixed so that mass ratio of these materials was 92.5:7.5, then the mixture was dissolved in a NMP solution to obtain an anode paste.

This anode paste was applied to both sides of a copper foil using a comma coater in the same way as was done for the cathode, then heated to 1200° C. and dried to obtain an anode. Then a pressure load was applied to this anode by a roll press, to make an anode sheet (2) having improved electrode density.

c) Lithium-Ion Secondary Battery

The cathode sheet (1) and the anode sheet (2) were wound with a separator (3) made using a 25 μm thick porous polyethylene sheet placed in between, to form a wound-type electrode body (4). The wound-type electrode body (4) was then inserted inside a battery case (5) so that lead tabs that were provided on both the cathode sheet (1) and anode sheet (2) were connected to a cathode terminal or an anode terminal.

Furthermore, the electrolyte was adjusted by dissolving $LiPF_6$ as a lithium salt into an organic solvent, which was a mixed solution in which ethylene carbonate (EC) and diethylene carbonate (DEC) were mixed at a volume ratio of 3:7, so as to be 1 mol/$dm^3$ in the electrolyte.

The electrolyte was then put into the battery case in which the wound-type electrode body was inserted, after which the opening of the battery case was sealed to obtain a lithium-ion secondary battery (6).

[Evaluation]

a) Initial Discharge Capacity

The lithium-ion secondary battery was left for about 24 hours, and after the open circuit voltage (OCV) became stable, the battery was charged to a cutoff voltage of 4.3 V with the electric current density of the cathode being 0.5 mA/$cm^2$. Charging was stopped for one hour, after which the capacity when the battery discharged to a cutoff voltage of 3.0 V was taken to be the initial discharge capacity. As a result, the initial discharge capacity of Example 1 was 156.8 mAh/g.

b) Low-temperature Output

Under temperature conditions of 25° C., the battery underwent constant current discharge to 3.0 V, and then charged at constant current and constant voltage and adjusted to a 40% charging potential. After that, the current was appropriately changed at −30° C. and the power was measured 2 seconds after the start of discharge and an I-V characteristics graph was created. With the discharge cutoff voltage taken to be 2.0V, the output found from this I-V characteristics graph was taken to be the extremely low-temperature output. As a result, the extremely low-temperature output of Example 1 was 132 W.

The production conditions for the cathode active material are given in Table 1, and the characteristics of the obtained cathode active material and lithium-ion secondary batter are given in Table 2.

Example 2

Except for adding lithium carbonate to the heat-treated particles in the mixing process so that Li/Me=1.12, and performing calcination in the calcination process at a calcination temperature of 890° C., a rate of temperature rise from room temperature (30° C.) to the calcination temperature of 8° C./min, and a maintenance time of 4 hours, the cathode active material was obtained in the same way as in Example 1 and evaluated. Here, the overall calcination time from the start of the temperature rise to the end of the maintenance time was 5.8 hours. The results are given in Table 1 and Table 2.

Example 3

Except for performing calcination in the calcination process at a calcination temperature of 890° C., a rate of temperature rise from room temperature (30° C.) to the calcination temperature of 8° C./min, and a maintenance time of 4 hours, the cathode active material was obtained in the same way as in Example 1 and evaluated. Here, the overall calcination time from the start of the temperature rise to the end of the maintenance time was 5.8 hours. The results are given in Table 1 and Table 2.

Example 4

Except for adding lithium carbonate to the heat-treated particles in the mixing process so that Li/Me=1.16, and performing calcination in the calcination process at a calcination temperature of 890° C., a rate of temperature rise from room temperature (30° C.) to the calcination temperature of 8° C./min, and a maintenance time of 4 hours, the cathode active material was obtained in the same way as in Example 1 and evaluated. Here, the overall calcination time from the start of the temperature rise to the end of the maintenance time was 5.8 hours. The results are given in Table 1 and Table 2.

Example 5

Except for adding lithium carbonate to the heat-treated particles in the mixing process so that Li/Me=1.12, and performing calcination in the calcination process at a calcination temperature of 930° C., a rate of temperature rise from room temperature (30° C.) to the calcination temperature of 8° C./min, and a maintenance time of 4 hours, the cathode active material was obtained in the same way as in Example 1 and evaluated. Here, the overall calcination time from the start of the temperature rise to the end of the maintenance time was 5.9 hours. The results are given in Table 1 and Table 2.

Example 6

Except for performing calcination in the calcination process at a calcination temperature of 930° C., a rate of temperature rise from room temperature (30° C.) to the calcination temperature of 8° C./min, and a maintenance time of 4 hours, the cathode active material was obtained in the same way as in Example 1 and evaluated. Here, the overall calcination time from the start of the temperature rise to the end of the maintenance time was 5.9 hours. The results are given in Table 1 and Table 2.

Example 7

Except for adding lithium carbonate to the heat-treated particles in the mixing process so that Li/Me=1.16, and performing calcination in the calcination process at a calcination temperature of 930° C., a rate of temperature rise from room temperature (30° C.) to the calcination temperature of 8° C./min, and a maintenance time of 4 hours, the cathode active material was obtained in the same way as in Example 1 and evaluated. Here, the overall calcination time from the start of the temperature rise to the end of the maintenance time was 5.9 hours. The results are given in Table 1 and Table 2.

Example 8

Except for adding lithium carbonate to the heat-treated particles in the mixing process so that Li/Me=1.12, and performing calcination in the calcination process at a calcination temperature of 960° C., a rate of temperature rise from room temperature (30° C.) to the calcination temperature of 8° C./min, and a maintenance time of 4 hours, the cathode active material was obtained in the same way as in Example 1 and evaluated. Here, the overall calcination time from the start of the temperature rise to the end of the maintenance time was 5.9 hours. The results are given in Table 1 and Table 2.

Example 9

Except for performing calcination in the calcination process at a calcination temperature of 960° C., a rate of temperature rise from room temperature (30° C.) to the calcination temperature of 8° C./min, and a maintenance time of 4 hours, the cathode active material was obtained in the same way as in Example 1 and evaluated. Here, the overall calcination time from the start of the temperature rise to the end of the maintenance time was 5.9 hours. The results are given in Table 1 and Table 2.

Example 10

Except for adding lithium carbonate to the heat-treated particles in the mixing process so that Li/Me=1.16, and performing calcination in the calcination process at a calcination temperature of 960° C., a rate of temperature rise from room temperature (30° C.) to the calcination temperature of 8° C./min, and a maintenance time of 4 hours, the cathode active material was obtained in the same way as in Example 1 and evaluated. Here, the overall calcination time from the start of the temperature rise to the end of the maintenance time was 5.9 hours. The results are given in Table 1 and Table 2.

Example 11

Except for performing calcination in the calcination process at a calcination temperature of 950° C., a rate of temperature rise from room temperature (30° C.) to the calcination temperature of 4° C./min, and a maintenance time of 3 hours, the cathode active material was obtained in the same way as in Example 1 and evaluated. Here, the overall calcination time from the start of the temperature rise to the end of the maintenance time was 6.8 hours. The results are given in Table 1 and Table 2.

Example 12

Except for performing calcination in the calcination process at a calcination temperature of 800° C., a rate of temperature rise from room temperature (30° C.) to the calcination temperature of 8° C./min, and a maintenance time of 3 hours, the cathode active material was obtained in the same way as in Example 1 and evaluated. Here, the overall calcination time from the start of the temperature rise to the end of the maintenance time was 4.6 hours. The results are given in Table 1 and Table 2.

Comparative Example 1

Except for performing calcination in the calcination process at a calcination temperature of 950° C., a rate of temperature rise from room temperature (30° C.) to the calcination temperature of 3° C./min, and a maintenance time of 3 hours, the cathode active material was obtained in the same way as in Example 1 and evaluated. Here, the overall calcination time from the start of the temperature rise to the end of the maintenance time was 8.1 hours. The results are given in Table 1 and Table 2.

Comparative Example 2

Except for performing calcination in the calcination process at a calcination temperature of 950° C., a rate of temperature rise from room temperature (30° C.) to the calcination temperature of 8° C./min, and a maintenance time of 10 hours, the cathode active material was obtained in the same way as in Example 1 and evaluated. Here, the overall calcination time from the start of the temperature rise to the end of the maintenance time was 11.9 hours. The results are given in Table 1 and Table 2.

Comparative Example 3

Except for performing calcination in the calcination process at a calcination temperature of 1050° C., and a rate of temperature rise from room temperature (30° C.) to the calcination temperature of 3° C./min, the cathode active material was obtained in the same way as in Example 1 and evaluated. Here, the overall calcination time from the start of the temperature rise to the end of the maintenance time was 5.7 hours. The results are given in Table 1 and Table 2.

Comparative Example 4

Except for adding lithium carbonate to the heat-treated particles in the mixing process so that Li/Me=0.94, the cathode active material was obtained in the same way as in Example 1 and evaluated. The results are given in Table 1 and Table 2.

Comparative Example 5

Except for adding lithium carbonate to the heat-treated particles in the mixing process so that Li/Me=1.22, the cathode active material was obtained in the same way as in Example 1 and evaluated. The results are given in Table 1 and Table 2.

Comparative Example 6

Except for performing calcination in the calcination process at a calcination temperature of 950° C., a rate of temperature rise from room temperature (30° C.) to the calcination temperature of 11° C./min, and a maintenance time of 3 hours, the cathode active material was obtained in the same way as in Example 1 and evaluated. Here, the overall calcination time from the start of the temperature rise to the end of the maintenance time was 4.4 hours. The results are given in Table 1 and Table 2.

Comparative Example 7

Except for performing calcination in the calcination process at a calcination temperature of 950° C., a rate of temperature rise from room temperature (30° C.) to the calcination temperature of 8° C./min, and a maintenance time of 6 hours, the cathode active material was obtained in the same way as in Example 1 and evaluated. Here, the overall calcination time from the start of the temperature rise to the end of the maintenance time was 7.9 hours. The results are given in Table 1 and Table 2.

Comparative Example 8

Except for performing calcination in the calcination process at a calcination temperature of 780° C., a rate of temperature rise from room temperature (30° C.) to the calcination temperature of 8° C./min, and a maintenance time of 3 hours, the cathode active material was obtained in the same way as in Example 1 and evaluated. Here, the overall calcination time from the start of the temperature rise to the end of the maintenance time was 4.6 hours. The results are given in Table 1 and Table 2.

TABLE 1

| | Calcination Process | | | | | |
|---|---|---|---|---|---|---|
| | Mixing Process Li/Me Ratio | Rate of Temperature Rise (° C./min) | Calcination Temperature (° C.) | Maintenance Time (hr) | Overall Calcination Time from Start of Temperature Rise to End of Maintenance time (hr) | Calcination atmosphere |
| Ex. 1 | 1.14 | 8 | 950 | 3 | 4.9 | Air |
| Ex. 2 | 1.12 | 8 | 890 | 4 | 5.8 | Air |
| Ex. 3 | 1.14 | 8 | 890 | 4 | 5.8 | Air |
| Ex. 4 | 1.16 | 8 | 890 | 4 | 5.8 | Air |
| Ex. 5 | 1.12 | 8 | 930 | 4 | 5.9 | Air |
| Ex. 6 | 1.14 | 8 | 930 | 4 | 5.9 | Air |
| Ex. 7 | 1.16 | 8 | 930 | 4 | 5.9 | Air |
| Ex. 8 | 1.12 | 8 | 960 | 4 | 5.9 | Air |
| Ex. 9 | 1.14 | 8 | 960 | 4 | 5.9 | Air |
| Ex. 10 | 1.16 | 8 | 960 | 4 | 5.9 | Air |
| Ex. 11 | 1.14 | 4 | 950 | 3 | 6.8 | Air |
| Ex. 12 | 1.14 | 8 | 800 | 3 | 4.6 | Air |
| CE. 1 | 1.14 | 3 | 950 | 3 | 8.1 | Air |
| CE. 2 | 1.14 | 8 | 950 | 10 | 11.9 | Air |
| CE. 3 | 1.14 | 3 | 1050 | 0 | 5.7 | Air |
| CE. 4 | 0.94 | 8 | 950 | 3 | 4.9 | Air |
| CE. 5 | 1.22 | 8 | 950 | 3 | 4.9 | Air |
| CE. 6 | 1.14 | 11 | 950 | 3 | 4.4 | Air |
| CE. 7 | 1.14 | 8 | 950 | 6 | 7.9 | Air |
| CE. 8 | 1.14 | 8 | 780 | 3 | 4.6 | Air |

TABLE 2

| | General formula | Crystal Structure | Average Particle Size (μm) | Specific Surface Area (m²/g) | Integrated Width Ratio | Peak Integrated Intensity Ratio | Initial Discharge Capacity (mAh/g) | Extremely low-temperature output (W) |
|---|---|---|---|---|---|---|---|---|
| Ex. 1 | $Li_{1.14}(Ni_{0.33}Co_{0.33}Mn_{0.33})_{0.993}Zr_{0.002}W_{0.005}O_2$ | LHCS | 5.2 | 1.2 | 1.48 | 1.23 | 156.8 | 132 |
| Ex. 2 | $Li_{1.12}(Ni_{0.33}Co_{0.33}Mn_{0.33})_{0.993}Zr_{0.002}W_{0.005}O_2$ | LHCS | 5.3 | 1.6 | 1.45 | 1.26 | 156.8 | 126 |
| Ex. 3 | $Li_{1.14}(Ni_{0.33}Co_{0.33}Mn_{0.33})_{0.993}Zr_{0.002}W_{0.005}O_2$ | LHCS | 5.3 | 1.5 | 1.45 | 1.25 | 157.0 | 131 |
| Ex. 4 | $Li_{1.16}(Ni_{0.33}Co_{0.33}Mn_{0.33})_{0.993}Zr_{0.002}W_{0.005}O_2$ | LHCS | 5.3 | 1.3 | 1.47 | 1.26 | 154.4 | 132 |
| Ex. 5 | $Li_{1.12}(Ni_{0.33}Co_{0.33}Mn_{0.33})_{0.993}Zr_{0.002}W_{0.005}O_2$ | LHCS | 5.1 | 1.6 | 1.43 | 1.25 | 158.4 | 120 |
| Ex. 6 | $Li_{1.14}(Ni_{0.33}Co_{0.33}Mn_{0.33})_{0.993}Zr_{0.002}W_{0.005}O_2$ | LHCS | 5.1 | 1.4 | 1.44 | 1.26 | 156.7 | 121 |
| Ex. 7 | $Li_{1.16}(Ni_{0.33}Co_{0.33}Mn_{0.33})_{0.993}Zr_{0.002}W_{0.005}O_2$ | LHCS | 5.2 | 1.2 | 1.45 | 1.26 | 155.0 | 128 |
| Ex. 8 | $Li_{1.12}(Ni_{0.33}Co_{0.33}Mn_{0.33})_{0.993}Zr_{0.002}W_{0.005}O_2$ | LHCS | 5.2 | 1.4 | 1.42 | 1.24 | 161.1 | 114 |
| Ex. 9 | $Li_{1.14}(Ni_{0.33}Co_{0.33}Mn_{0.33})_{0.993}Zr_{0.002}W_{0.005}O_2$ | LHCS | 5.2 | 1.2 | 1.40 | 1.26 | 158.8 | 118 |
| Ex. 10 | $Li_{1.16}(Ni_{0.33}Co_{0.33}Mn_{0.33})_{0.993}Zr_{0.002}W_{0.005}O_2$ | LHCS | 5.3 | 1.1 | 1.44 | 1.27 | 155.9 | 118 |
| Ex. 11 | $Li_{1.14}(Ni_{0.33}Co_{0.33}Mn_{0.33})_{0.993}Zr_{0.002}W_{0.005}O_2$ | LHCS | 5.2 | 1.2 | 1.46 | 1.19 | 153.5 | 111 |
| Ex. 12 | $Li_{1.14}(Ni_{0.33}Co_{0.33}Mn_{0.33})_{0.993}Zr_{0.002}W_{0.005}O_2$ | LHCS | 5.3 | 1.9 | 1.41 | 1.31 | 152.1 | 119 |
| CE. 1 | $Li_{1.14}(Ni_{0.33}Co_{0.33}Mn_{0.33})_{0.993}Zr_{0.002}W_{0.005}O_2$ | LHCS | 5.1 | 1.1 | 1.36 | 1.28 | 155.2 | 106 |
| CE. 2 | $Li_{1.14}(Ni_{0.33}Co_{0.33}Mn_{0.33})_{0.993}Zr_{0.002}W_{0.005}O_2$ | LHCS | 5.1 | 1.0 | 1.32 | 1.25 | 154.7 | 98 |
| CE. 3 | $Li_{1.14}(Ni_{0.33}Co_{0.33}Mn_{0.33})_{0.993}Zr_{0.002}W_{0.005}O_2$ | Heterogeneous | 5.4 | 0.7 | 1.35 | 1.29 | 138.4 | 104 |
| CE. 4 | $Li_{0.94}(Ni_{0.33}Co_{0.33}Mn_{0.33})_{0.993}Zr_{0.002}W_{0.005}O_2$ | LHCS | 5.1 | 1.5 | 1.37 | 1.20 | 163.1 | 105 |
| CE. 5 | $Li_{1.22}(Ni_{0.33}Co_{0.33}Mn_{0.33})_{0.993}Zr_{0.002}W_{0.005}O_2$ | LHCS | 5.5 | 0.8 | 1.52 | 1.21 | 135.3 | 116 |
| CE. 6 | $Li_{1.14}(Ni_{0.33}Co_{0.33}Mn_{0.33})_{0.993}Zr_{0.002}W_{0.005}O_2$ | LHCS | 5.2 | 1.3 | 1.35 | 1.19 | 133.2 | 101 |
| CE. 7 | $Li_{1.14}(Ni_{0.33}Co_{0.33}Mn_{0.33})_{0.993}Zr_{0.002}W_{0.005}O_2$ | LHCS | 5.1 | 1.2 | 1.34 | 1.25 | 155.5 | 100 |
| CE. 8 | $Li_{1.14}(Ni_{0.33}Co_{0.33}Mn_{0.33})_{0.993}Zr_{0.002}W_{0.005}O_2$ | Heterogeneous | 5.3 | 1.9 | 1.30 | 1.30 | 129.8 | 99 |

* Crystal Structure - LHCS: Layered hexagonal crystal structure; Heterogeneous: There is a heterogeneous phase.

(Overall Evaluation)

It can be seen from Table 1 and Table 2 that in the case of Examples 1 to 12 in which the compositions of the cathode active material and the conditions in the calcination process are within the range specified by the present invention, it is possible to control the integrated width ratio to be 1.38 or greater, therefore it is possible for the initial discharge capacity to be 150 mAh/g or greater and the extremely low-temperature output 110 W or greater. Particularly, in Examples 1 to 10 and 12 in which the peak integrated intensity ratio was controlled to be 1.20 or greater, it can be seen that it was possible for the extremely low-temperature output to be 114 W or greater.

On the other hand, in Comparative Examples 1. to 3 and 6 to 8 in which one or more of the conditions in the calcination process is outside the range specified by the present invention, it is not possible to control the integrated width ratio to be 1.38 or greater, and the extremely low-temperature output decreases.

Moreover, in Comparative Example 4, even though the conditions in the calcination process are within the range specified by the present invention, the value of Li/Me is too small, so the cathode resistance becomes large and the extremely low-temperature output decreases.

Furthermore, in Comparative Example 5, even though the conditions in the calcination process are within the range specified by the present invention, the value of Li/Me is too large, so the initial discharge capacity decreases.

Figure 2:
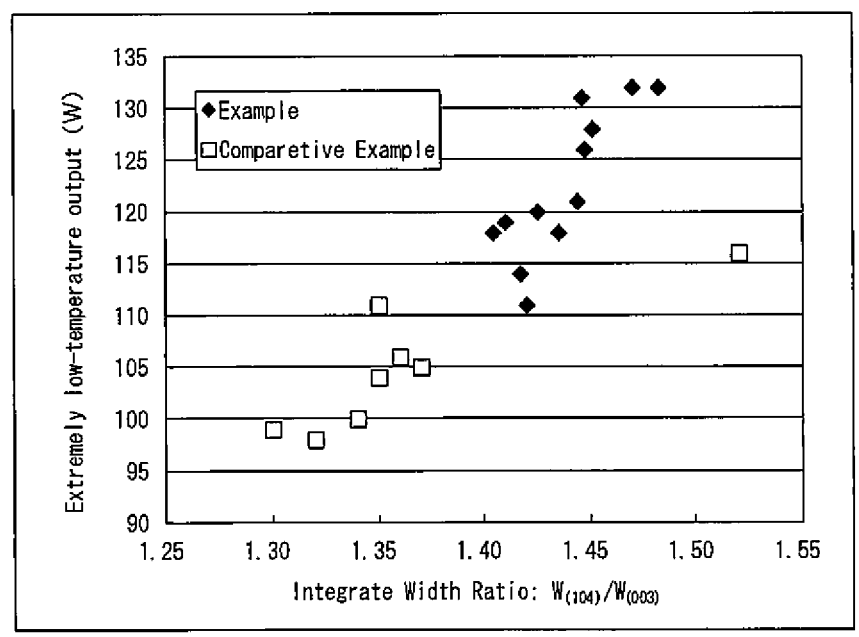
FIG. 2 illustrates the relationship between the integrated width ratio and the output at −30° C.
Figure 3:
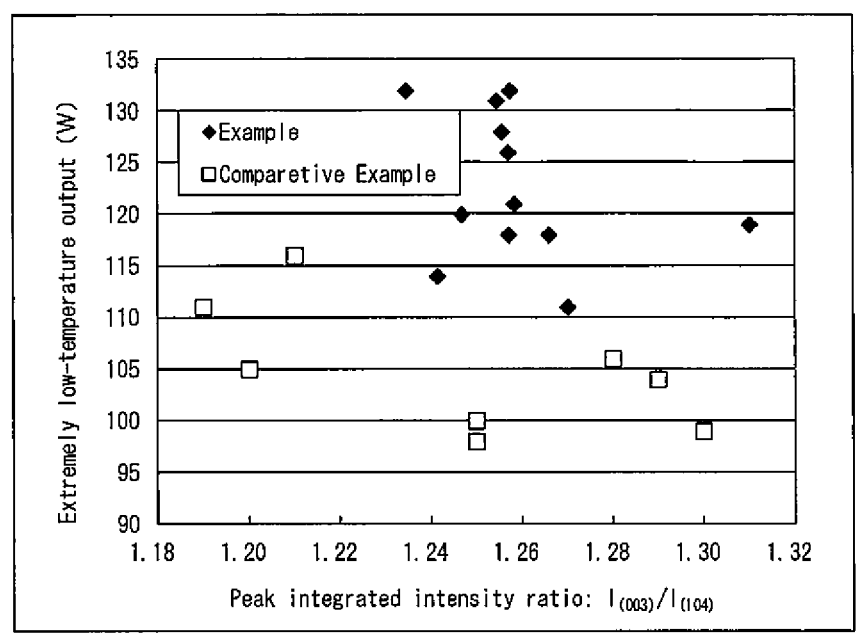
FIG. 3 illustrates the relationship between the peak integrated intensity ratio and the output at −30° C.

FIG. 2 illustrates the relationship between the integrated width ratio and the output at −30° C. (extremely low-temperature output), and FIG. 3 illustrates the relationship between the peak integrated intensity ratio and the extremely low-temperature output. From FIG. 2, it can be seen that the larger the integrated width ratio is, there it is tendency for the extremely low-temperature output to improve, and particularly, it can be seen that in order to obtain an output of 110 W or greater in an extremely low-temperature environment, it is necessary to control the integrated width ratio to be 1.38 or greater. Moreover, from FIG. 3, it can be seen that by making the peak integrated intensity ratio 1.20 or greater, it is possible to obtain good extremely low-temperature output.

EXPLANATION OF REFERENCE NUMBERS

1 Cathode sheet
2 Anode sheet
3 Porous separator
4 Electrode body
5 Battery case
6 Lithium-ion secondary battery

What is claimed is:

1. A cathode active material for a non-aqueous electrolyte secondary battery expressed by a general formula (A):

$Li_{1+a}Ni_xCo_yMn_zM_tO_2$, where $0.12 < a \leq 0.20$, $x+y+z+t=1$, $0.30 \leq x \leq 0.50$, $0.30 < y \leq 0.40$, $0.15 \leq z \leq 0.40$, $0.0003 < t \leq 0.01$, and M is one or more element selected from among Ca, Mg, Al, Ti, V, Cr, Zr, Nb, Mo, Hf, Ta, and W, and includes layered hexagonal crystal lithium nickel cobalt manganese composite oxide particles;

the lithium nickel cobalt manganese composite oxide particles comprise spherical shaped secondary particles that are formed by an aggregation of plural primary particles, wherein the primary particles have a spherical shape;

wherein a ratio of an integrated width of a diffraction peak on plane (104) with respect to an integrated width of a diffraction peak on plane (003) of the Miller indices (hkl) in powder Xray diffraction that uses CuKα rays is 1.38 or greater and 1.49 or less; and a ratio of a peak integrated intensity on plane (003) with respect to a peak integrated intensity on plane (104) of the Miller indices (hkl) in powder X-ray diffraction that uses CuKα rays is 1.23 or greater and 1.29 or less.

2. The cathode active material for a non-aqueous electrolyte secondary battery according to claim 1, wherein the integrated width ratio is within the range of 1.39 to 1.49.

3. The cathode active material for a non-aqueous electrolyte secondary battery according to claim 1, wherein a volume-average particle size that is found by a laser diffraction and scattering method is within a range of 3 μm to 20 μm.

4. The cathode active material for a non-aqueous electrolyte secondary battery according to claim 1, wherein a specific surface area is within a range of 0.3 $m^2m^2/g$ to 2.5 $m^2/g$.

5. A manufacturing method for a cathode active material for a non-aqueous electrolyte secondary battery according to claim 1, the method comprising:
a crystallization process for obtaining composite hydroxide particles expressed by a general formula (B): $Ni_xCo_yMn_zM_t(OH)_{2+\alpha}$, where x+y+z+t=1, 0.30≤x≤0.70, 0.30<y≤0.40, 0.10≤z≤0.40, 0.0003<t≤0.01, and M is one or more element selected from among Ca, Mg, Al, Ti, V, Cr, Zr, Nb, Mo, Hf, Ta, and W, the process comprising:
obtaining a mixed aqueous solution in which metal compound of nickel, cobalt, manganese and additional elements (M) are dissolved at the composition ratios expressed by the general formula (B),
adding an ammonium-ion donor to the mixed aqueous solution while stirring,
forming a reaction aqueous solution by adding a sodium hydroxide aqueous solution to the mixed aqueous solution, and
crystallizing the composite hydroxide particles from the reaction aqueous solution by using a batch-type crystallization method, wherein the composite hydroxide particles have a spherical shape and the batch type crystallization method comprises:
a nucleation stage, wherein a nuclei of composite hydroxide particles form, and
a particle growth stage, wherein the composite hydroxide particles grow around the nuclei,
wherein particles forming the nuclei in the nucleation stage and particles of the growth stage are clearly separated,
a mixing process for obtaining a lithium mixture by mixing a lithium compound with the nickel cobalt manganese composite hydroxide particles that are expressed by general formula (B) so that the ratio of the number of atoms of lithium with respect to the total number of atoms of metal elements other than lithium is more than 1:1.12 and 1:1.2 or less; and
a calcination process of performing calcination of the lithium mixture in an oxidizing atmosphere where a rate of temperature rise in at least the temperature range from 30° C. to 800° C. is 4° C./min to 9° C./min, the calcination temperature is 800° C. to 1000° C., the maintenance time at the calcination temperature is 4 hours or less, and time from the start of temperature rise to the end of the maintenance time is 4.0 hours to 6.9 hours.

6. The manufacturing method for a cathode active material for a non-aqueous electrolyte secondary battery according to claim 5, further comprising
a heat-treatment process before the mixing process for heat treating the nickel cobalt manganese composite hydroxide particles to 105° C. to 400° C. to obtain heat-treated particles.

7. The manufacturing method for a cathode active material for a non-aqueous electrolyte secondary battery according to claim 5, wherein lithium carbonate, lithium hydroxide or a mixture of these is used as the lithium compound.

8. The manufacturing method for a cathode active material for a non-aqueous electrolyte secondary battery according to claim 5, wherein the oxygen concentration in the oxidizing atmosphere is 10% by volume to 100% by volume.

9. The manufacturing method for a cathode active material for a non-aqueous electrolyte secondary battery according to claim 5, further comprising
a crushing process after the calcination process for crushing the lithium nickel cobalt manganese composite particles that were obtained in the calcination process.

10. A non-aqueous electrolyte secondary battery comprising a cathode, an anode, a separator and a non-aqueous electrolyte, wherein the cathode comprises the cathode active material of claim 1.

11. The non-aqueous electrolyte secondary battery according to claim 10, wherein an initial discharge capacity is 150 mAh/g or greater, and an output at −30° C. is 110 W or greater.

* * * * *